US010237035B2

United States Patent
Kim et al.

(10) Patent No.: US 10,237,035 B2
(45) Date of Patent: Mar. 19, 2019

(54) OPERATION METHOD OF COMMUNICATION NODE SUPPORTING SUPERPOSITION TRANSMISSION IN CELLULAR COMMUNICATION SYSTEM

(71) Applicant: Electronics and Telecommunications Research Institute, Daejeon (KR)

(72) Inventors: Jung Bin Kim, Daejeon (KR); In Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 43 days.

(21) Appl. No.: 15/609,426

(22) Filed: May 31, 2017

(65) Prior Publication Data

US 2017/0367054 A1  Dec. 21, 2017

(30) Foreign Application Priority Data

Jun. 15, 2016 (KR) .......................... 10-2016-0074659
May 2, 2017 (KR) .......................... 10-2017-0056178

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0003* (2013.01); *H04L 1/0009* (2013.01);
(Continued)

(58) Field of Classification Search
CPC ... H04L 5/0048; H04L 1/0003; H04L 1/0009; H04L 5/0091; H04W 52/245; H04W 52/262
See application file for complete search history.

(56) References Cited

U.S. PATENT DOCUMENTS

| 9,438,282 B2 | 9/2016 | Kishiyama et al. |
| 2010/0248729 A1* | 9/2010 | Yu .................................. 455/450 |

(Continued)

OTHER PUBLICATIONS

Ding, Zhiguo, et al. "On the Performance of Non-Orthogonal Multiple Access in 5G Systems with Randomly Deployed Users." *IEEE Signal Processing Letters* 21.12 (2014): 1501-1505. (5 pages, in English).

*Primary Examiner* — Ronald B Abelson
(74) *Attorney, Agent, or Firm* — NSIP Law

(57) ABSTRACT

Disclosed are operation methods of communication nodes supporting superposition transmission in a cellular communication system. An operation method of a base station comprises dividing a transmission block used for communications in the communication system into a plurality of sub transmission blocks each of which includes at least one resource block; setting transmit power allocation coefficients respectively for the plurality of sub transmission blocks; and transmitting the transmission block to which a superimposed signal is mapped, the superimposed signal including information indicating a number of resource blocks included in each of the plurality of sub transmission blocks, information indicating the transmit power allocation coefficients, first data units for the first terminal, and second data units for the second terminal. The first data units and the second data units are mapped to a same resource in the transmission block.

19 Claims, 10 Drawing Sheets

(51) Int. Cl.
*H04W 52/24* (2009.01)
*H04W 52/26* (2009.01)

(52) U.S. Cl.
CPC ......... *H04L 5/0091* (2013.01); *H04W 52/245* (2013.01); *H04W 52/262* (2013.01)

(56) References Cited

U.S. PATENT DOCUMENTS

| | | |
|---|---|---|
| 2011/0085506 A1 | 4/2011 | Lee et al. |
| 2015/0351081 A1 | 12/2015 | Zhu et al. |
| 2015/0372740 A1* | 12/2015 | Ko ..................... H04B 7/0626 |
| 2016/0014625 A1* | 1/2016 | Devarasetty .......... H04W 24/06 |
| 2016/0014785 A1 | 1/2016 | Benjebbour et al. |
| 2016/0128042 A1 | 5/2016 | Choi et al. |
| 2016/0142193 A1 | 5/2016 | Benjebbour et al. |
| 2016/0191174 A1 | 6/2016 | Hwang et al. |
| 2016/0191175 A1 | 6/2016 | Hwang et al. |
| 2018/0054757 A1* | 2/2018 | Nanri .................... H04W 28/06 |

\* cited by examiner

OPERATION METHOD OF COMMUNICATION NODE SUPPORTING SUPERPOSITION TRANSMISSION IN CELLULAR COMMUNICATION SYSTEM

CROSS-REFERENCE TO RELATED APPLICATIONS

This application claims priorities to Korean Patent Applications No. 10-2016-0074659 filed on Jun. 15, 2016 and No. 10-2017-0056178 filed on May 2, 2017 in the Korean Intellectual Property Office (KIPO), the entire contents of which are hereby incorporated by reference.

BACKGROUND

1. Technical Field

The present disclosure relates to transmission and reception methods in a cellular communication system, and more specifically, to operation methods of communication entities supporting superposition transmission in a cellular communication system.

2. Related Art

In a cellular communication system, a terminal (also referred to as 'user equipment) may generally transmit and receive data units through a base station. For example, if there is a data unit to be transmitted to a second terminal, a first terminal may generate a message including the data unit to be transmitted to the second terminal, and transmit the generated message to the first base station. Then, the first base station may receive the message from the first terminal and identify that the destination of the received message is the second terminal. The first base station may transmit the message to a second base station to which the second terminal, the identified destination, belongs. The second base station may receive the message from the first base station and identify that the destination of the received message is the second terminal, and the second base station may transmit the message to the second terminal which is the identified destination. Finally, the second terminal may receive the message from the second base station and obtain the data unit contained in the received message.

Meanwhile, in the cellular communication system, in the case that the first terminal and the second terminal are connected to the first base station, and a first data unit to be transmitted to the first terminal and a second data unit to be transmitted to the second terminal exist in the first base station, the first base station may transmit the first data unit and the second data unit using the same resource (e.g., the same time and frequency resource). For example, when a channel state between the first base station and the first terminal is different from a channel state between the first base station and the second terminal, the first base station may transmit the first data unit and the second data unit through the same time and frequency resource by using different transmit power allocation coefficients for two terminals. Such the transmission technique may be referred to as a superposition transmission technique. In the case that such the superposition transmission technique is used, the first terminal and the second terminal may respectively acquire the first data unit and the second data unit from the first base station based on parameters required for the superposition transmission.

That is, when the superposition transmission technique is used in a cellular communication system, the parameters required for the superposition transmission should be signaled from the base station to the terminals. However, additional resources (e.g., resources for a control channel) may be required for signaling the parameters required for the superposition transmission, thereby reducing the capacity and performance of the cellular communication system.

SUMMARY

Accordingly, embodiments of the present disclosure provide operation methods of a base station and a terminal for supporting superposition transmission in a cellular communication system.

In order to achieve the objective of the present disclosure, an operation method of a base station in a communication system including the base station, a first terminal, and a second terminal may be provided. The operation method may comprise dividing a transmission block used for communications in the communication system into a plurality of sub transmission blocks each of which includes at least one resource block; setting transmit power allocation coefficients respectively for the plurality of sub transmission blocks; and transmitting the transmission block to which a superimposed signal is mapped, the superimposed signal including information indicating a number of resource blocks included in each of the plurality of sub transmission blocks, information indicating the transmit power allocation coefficients, first data units for the first terminal, and second data units for the second terminal, wherein the first data units and the second data units are mapped to a same resource in the transmission block.

A same modulation and coding scheme (MCS) level may be applied to the plurality of sub transmission blocks included in the transmission block.

The plurality of sub transmission blocks may be configured based on a first channel state between the base station and the first terminal and a second channel state between the base station and the second terminal.

The information indicating the number of resource blocks included in each of the plurality of sub transmission blocks and the information indicating the transmit power allocation coefficients may be included in downlink control information (DCI) of the superimposed signal.

The first data units may be transmitted using a power based on a first transmit power allocation coefficient set for the first terminal, the second data units may be transmitted using a power based on a second transmit power allocation coefficient set for the second terminal, and the first transmit power allocation coefficient may be different from the second transmit power allocation coefficient.

The transmit power allocation coefficients may be indicated by reference signals mapped to the transmission block, and a resource used for transmission of the reference signals may be dynamically configured based on changes in channel states in a frequency domain.

A first reference signal for the first terminal may be set to be orthogonal to a second reference signal for the second terminal, the first reference signal may be transmitted using a power based on a first transmit power allocation coefficient set for the first terminal, the second reference signal may be transmitted using a power based on a second transmit power allocation coefficient set for the second terminal, and the first transmit power allocation coefficient may be different from the second transmit power allocation coefficient.

The superimposed signal may further include information indicating increment or decrement of transmit power allocation coefficients for remaining sub transmission blocks excluding a first sub transmission block among the plurality of sub transmission blocks, when the information indicating the transmit power allocation coefficients indicates a first transmit power allocation coefficient for the first sub transmission block among the plurality of sub transmission blocks.

In order to achieve the objective of the present disclosure, an operation method of a first terminal in a communication system including a base station, the first terminal, and a second terminal may be provided. The operation method may comprise receiving a transmission block to which a superimposed signal is mapped, the superimposed signal including information indicating a number of resource blocks included in each of a plurality of sub transmission blocks, information indicating transmit power allocation coefficients, first data units for the first terminal, and second data units for the second terminal, wherein the transmission block used for communications in the communication system is divided into the plurality of sub transmission blocks each of which includes at least one resource block, and the transmit power allocation coefficients are set respectively for the plurality of sub transmission blocks; identifying the transmit power allocation coefficients based on the information indicating transmit power allocation coefficients; and decoding the first data units from the superimposed signal by using a channel matrix between the first terminal and the base station and the transmit power allocation coefficients for the plurality of sub transmission blocks, wherein the first data units and the second data units are mapped to a same resource in the transmission block.

A same modulation and coding scheme (MCS) level may be applied to the plurality of sub transmission blocks included in the transmission block.

The information indicating the number of resource blocks included in each of the plurality of sub transmission blocks and the information indicating the transmit power allocation coefficients may be included in downlink control information (DCI) of the superimposed signal.

The first data units may be transmitted using a power based on a first transmit power allocation coefficient set for the first terminal, the second data units may be transmitted using a power based on a second transmit power allocation coefficient set for the second terminal, and the first transmit power allocation coefficient may be different from the second transmit power allocation coefficient.

The transmit power allocation coefficients may be indicated by reference signals mapped to the transmission block, and a resource used for transmission of the reference signals may be dynamically configured based on changes in channel states in a frequency domain.

A first reference signal for the first terminal may be set to be orthogonal to a second reference signal for the second terminal, the first reference signal may be transmitted using a power based on a first transmit power allocation coefficient set for the first terminal, the second reference signal may be transmitted using a power based on a second transmit power allocation coefficient set for the second terminal, and the first transmit power allocation coefficient may be different from the second transmit power allocation coefficient.

The superimposed signal may further include information indicating increment or decrement of transmit power allocation coefficients for remaining sub transmission blocks excluding a first sub transmission block among the plurality of sub transmission blocks, when the information indicating the transmit power allocation coefficients indicates a first transmit power allocation coefficient for the first sub transmission block among the plurality of sub transmission blocks.

In order to achieve the objective of the present disclosure, a first terminal in a communication system including a base station, the first terminal, and a second terminal may be provided. The first terminal may comprise a processor; and a memory storing at least one instruction executed by the processor, and the at least one instruction may be configured to receive a transmission block to which a superimposed signal is mapped, the superimposed signal including information indicating a number of resource blocks included in each of a plurality of sub transmission blocks, information indicating transmit power allocation coefficients, first data units for the first terminal, and second data units for the second terminal, wherein the transmission block used for communications in the communication system is divided into the plurality of sub transmission blocks each of which includes at least one resource block, and the transmit power allocation coefficients are set respectively for the plurality of sub transmission blocks; identify the transmit power allocation coefficients based on the information indicating transmit power allocation coefficients; and decode the first data units from the superimposed signal by using a channel matrix between the first terminal and the base station and the transmit power allocation coefficients for the plurality of sub transmission blocks, the first data units and the second data units being mapped to a same resource in the transmission block.

A same modulation and coding scheme (MCS) level may be applied to the plurality of sub transmission blocks included in the transmission block.

The information indicating the number of resource blocks included in each of the plurality of sub transmission blocks and the information indicating the transmit power allocation coefficients may be included in downlink control information (DCI) of the superimposed signal.

The transmit power allocation coefficients may be indicated by reference signals mapped to the transmission block, and a resource used for transmission of the reference signals may be dynamically configured based on changes in channel states in a frequency domain.

The superimposed signal may further include information indicating increment or decrement of transmit power allocation coefficients for remaining sub transmission blocks excluding a first sub transmission block among the plurality of sub transmission blocks, when the information indicating the transmit power allocation coefficients indicates a first transmit power allocation coefficient for the first sub transmission block among the plurality of sub transmission blocks.

In accordance with embodiments of the present disclosure, parameters (e.g., the size of a transmission block, the size of a sub transport block, transmit power allocation coefficients, increment or decrement of transmit power allocation coefficients, etc.) required for superposition transmission in a cellular communication system may be signaled from a base station to a terminal through at least one of system information (SI), downlink control information (DCI), and reference signals. For example, information indicating the sizes of the transmission block and the sub transmission block may be signaled via SI or DCI, and the information indicating increment or decrement of transmit power allocation coefficients may be signaled via DCI or reference signals. Here, the size of transmission block may be determined such that a same modulation and coding scheme (MCS) level is used for all sub transmission blocks included in the transmission block, and the size of the sub transmission block may be determined such that a same transmit power allocation coefficient is used for each sub transmission block.

Therefore, since the same MCS level is used for the transmission block, complexity of decoding operation on data units is reduced. Also, since the control information can be signaled using a single DCI, resources used for transmission of the required parameters for the superposition transmission are reduced. As a result, capacity and performance of the cellular communication system are improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
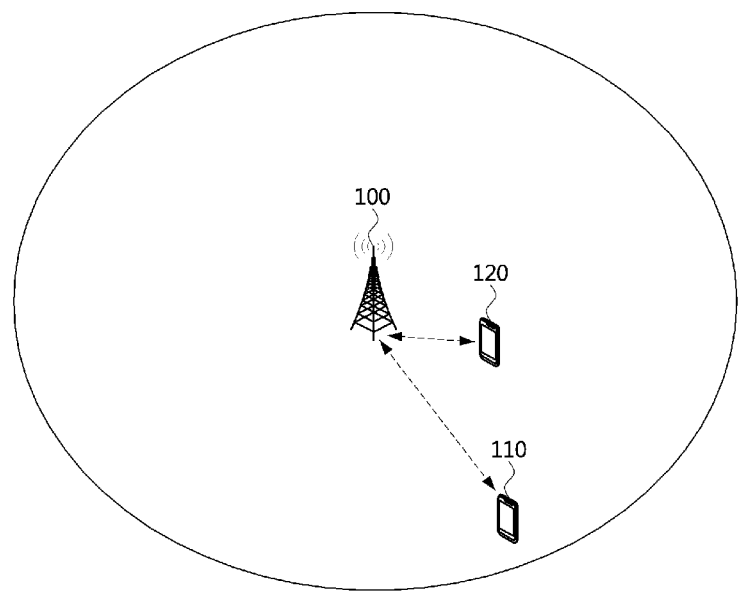
FIG. 1 is a conceptual diagram illustrating a first embodiment of a cellular communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a cellular communication system.

Referring to FIG. 1, a cellular communication system may comprise a base station 100, terminals 110 and 120, and the like. Here, the cellular communication system may also be referred to as a cellular communication network. Each of the base station 100 and the terminals 110 and 120 included in the cellular communication system may support at least one communication protocol. For example, each of the base station 100 and the terminals 110 and 120 may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the base station 100 and the terminals 110 and 120 may have the following structure.

Figure 2:
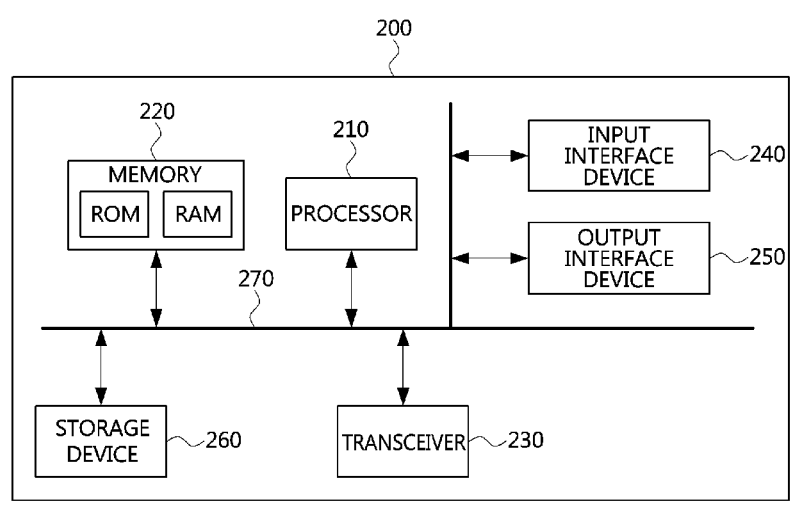
FIG. 2 is a block diagram illustrating a first embodiment of a communication node constituting a cellular communication system.

FIG. 2 is a block diagram illustrating a first embodiment of a communication node constituting a cellular communication system.

Referring to FIG. 2, a communication node 200 may be the base station 100, the terminal 110, or the terminal 120 shown in FIG. 1. The communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the base station 100 may form a macro cell or a small cell. The first terminal 110 and the second terminal 120 may belong to cell coverage of the base station 100 and may be connected to the base station 100. For example, each of the first terminal 110 and the second terminal 120 may transmit an uplink data unit to the base station 100. The base station 100 may receive an uplink data unit from each of the first terminal 110 and the second terminal 120 and may transmit the received uplink data unit to a core network (not depicted in FIG. 1). Also, the base station 100 may receive a downlink data unit from the core network and may transmit the received downlink data unit to the first terminal 110 and the second terminal 120, respectively. Each of the first terminal 110 and the second terminal 120 may receive the downlink data unit from the base station 100. The core network may comprise a serving gateway (S-GW), a packet data network (PDN) gateway (P-GW), a mobility management entity (MME), and the like.

Also, each of the base station 100 and the terminals 110 and 120 may support a 4G communication technology (e.g., LTE (Long Term Evolution), LTE-A (LTE advanced), etc.) defined in 3GPP (3rd Generation Partnership Project), a 5G communication technology (e.g., millimeter wave (mm-Wave) based communication technology, etc.), or the like. For example, the base station 100 may support OFDMA-based downlink transmission and SC-FDMA-based uplink reception. The base station 100 may also perform multiple-input multiple-output (MIMO) transmission (e.g., single user MIMO (SU-MIMO), multi user MIMO (MU-MIMO), massive MIMO, etc.), carrier aggregation transmission, transmission in an unlicensed band (e.g., licensed assisted access (LAA) communications), device-to-device (D2D) communications (e.g., proximity services (ProSe), sidelink communications, etc.), and NOMA communications. Herein, each of the first terminal 110 and the second terminal 120 may perform an operation corresponding to that of the base station 100 and an operation supported by the base station 100.

Meanwhile, in a cellular communication system, the base station 100 and the terminals 110 and 120 may transmit and receive signals using a superposition transmission technique (e.g., NOMA technique). For example, in a case that a first downlink signal (e.g., a downlink data unit) to be transmitted to the first terminal 110 is $S_1$ and a second downlink signal (e.g., a downlink data unit) to be transmitted to the second terminal is $S_2$, the base station 100 may generate a superimposed signal x based on Equation 1.

$$x=\sqrt{\alpha_1 S_1}+\sqrt{\alpha_2 S_2} \qquad \text{[Equation 1]}$$

In Equation 1, x may be a superimposed signal, $\alpha_1$ may be a transmit power allocation coefficient for $S_1$, and $\alpha_2$ may be a transmit power allocation coefficient for $S_2$. The base station 100 may transmit the superimposed x. The first terminal 110 may receive the superimposed signal transmitted from the base station 100, and a superimposed signal (hereinafter referred to as the "first reception signal") received at the first terminal 110 may be represented by Equation 2.

$$y_1=h_1(\sqrt{\alpha_1 S_1}+\sqrt{\alpha_2 S_2})+n_1 \qquad \text{[Equation 2]}$$

In Equation 2, $y_1$ may be the first reception signal at the first terminal 110 and $h_1$ and $n_1$ may be a channel matrix and a noise vector of a first channel between the base station 100 and the first terminal 110, respectively. For example, $h_1$ may indicate a state of the first channel. Also, the second terminal 120 may receive the superimposed signal transmitted from the base station 100 and a superimposed signal (hereinafter referred to as "second reception signal") received at the second terminal 120 may be represented by Equation 3.

$$y_2=h_2(\sqrt{\alpha_1 S_1}+\sqrt{\alpha_2 S_2})+n_2 \qquad \text{[Equation 3]}$$

In Equation 3, $y_2$ may be the second reception signal at the second terminal 120, and $h_2$ and $n_2$ may be a channel matrix and a noise vector of a second channel between the base station 100 and the second terminal 120, respectively. For example, $h_2$ may indicate a state of the second channel.

Meanwhile, when a relation between $h_1$ and $h_2$ is expressed by Equation 4, it may indicate that the state of the first channel is worse than the state of the second channel In this case, the base station 100 may allocate a relatively larger transmit power for a terminal having a poor channel state (e.g., the first terminal 110) in order to maintain reliability of a transmission signal.

$$|h_1|<|h_2| \qquad \text{[Equation 4]}$$

For example, the transmit power allocation coefficients in the above case may be set based on Equation 5 below.

$$\alpha_1>\alpha_2 \qquad \text{[Equation 5]}$$

When the first reception signal $y_1$ is received from the base station 100, the first terminal 110 may acquire the first downlink signal $S_1$ by decoding the first reception signal $y_1$ using $h_1$ and $\alpha_1$. Here, the first terminal 110 may regard $h_1\sqrt{\alpha_2 S_2}$ included in the first reception signal $y_1$ as noise.

When the second reception signal $y_2$ is received from the base station 100, the second terminal 120 may acquire the first downlink signal $S_1$ by decoding the second reception signal $y_2$ using $h_2$ and $\alpha_1$, and may remove $h_2\sqrt{\alpha_1 S_1}$ from the second received signal $y_2$ by using the first downlink signal $S_1$. Thereafter, the second terminal 120 may acquire the second downlink signal $S_2$ from the second received signal $y_2$ by using $h_2$ and $\alpha_2$. Therefore, interference due to the first downlink signal $S_1$ may not exist in the decoding operation of the second downlink signal $S_2$. The first terminal 110 may be required to know $h_1$ and $a_1$ in order to decode the first received signal $y_1$, and the second terminal 120 may be required to know $h_2$, $a_1$, and $a_2$ for decoding operation of the second received signal $y_2$.

Meanwhile, an adaptive modulation and coding (AMC) technique and a scheduling technique may be used to improve a data rate of data units in a cellular communication system. In a case that the AMC technique is used, the base station may adjust a modulation and coding scheme (MCS) level according to a channel state between the base station and the terminal to maintain a target reception error rate. For example, if the channel state is bad, the base station may lower the MCS level so that an actual reception error rate at the terminal is decreased to the target reception error rate. If the channel state is good, the base station may increase the MCS level so that the actual reception error rate at the terminal is increased to the target reception error rate. Therefore, when the AMC technique is used, the actual reception error rate at the terminal may be maintained at the target reception error rate through adjustment of the MCS level, and the maximum data rate of data units may be provided while the actual reception error rate is maintained at the target reception error rate.

When the scheduling technique is used, the base station may selectively allocate resources (e.g., time and frequency resources) to the terminal in consideration of the channel state of the terminal, quality of service (QoS), and the like. Here, the scheduling technique may be a Greedy algorithm based scheduling technique, a proportional fairness (PF) based scheduling technique, or the like.

In the case that the AMC technique, the scheduling technique, or the like is used in the cellular communication system, the base station may transmit AMC information (e.g., MCS level information) and scheduling information (e.g., time and frequency resources allocated to the terminal) to the terminal through a control channel of a downlink subframe. The AMC information, the scheduling information, and the like may be transmitted as downlink control information (DCI), and a DCI format 1 may include information elements described in Table 1 below.

TABLE 1

| Information Element | Size |
| --- | --- |
| Aperiodic channel quality indicator (CQI) | 1 bit |
| Channel state information (CSI) request | 1 bit or 2 bits |
| Sounding reference signal (SRS) request | 0 bit or 1 bit |
| Resource allocation type | 1 bit |
| Carrier indicator | 0 bit or 3 bits |
| Resource allocation header | 0 bit or 1 bit |
| Resource block allocation | 6~25 bits (variable) |
| AMC level (e.g., MCS level) | 5 bits |
| Hybrid automatic repeat request (HARQ) process | 3 bits |
| New data indicator (NDI) | 1 bit |
| Redundancy version (RV) | 2 bits |

TABLE 1-continued

| Information Element | Size |
| --- | --- |
| Transmit power control (TPC) command for PUCCH | 2 bits |

Meanwhile, a frame structure used in the cellular communication system may be as follows.

Figure 3:
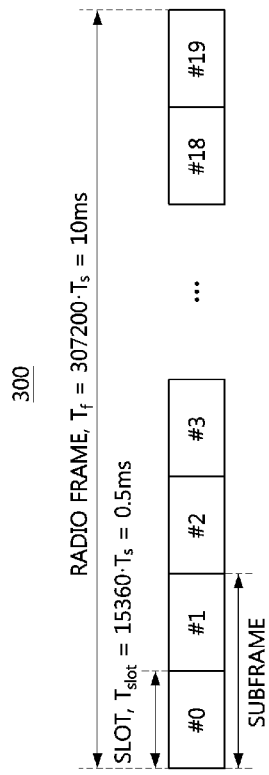
FIG. 3 is a conceptual diagram illustrating a first embodiment of a type 1 frame.

FIG. 3 is a conceptual diagram illustrating a first embodiment of a type 1 frame.

Referring to FIG. 3, a radio frame 300 may comprise 10 subframes, and a subframe may comprise 2 slots. Thus, the radio frame 600 may comprise 20 slots (e.g., slot #0, slot #1, slot #2, slot #3, . . . , slot #18, and slot #19). The length of the radio frame ($T_f$) 300 may be 10 milliseconds (ms). The length of the subframe may be 1 ms, and the length of a slot ($T_{slot}$) may be 0.5 ms. Here, $T_s$ may be 1/30,720,000s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on the configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
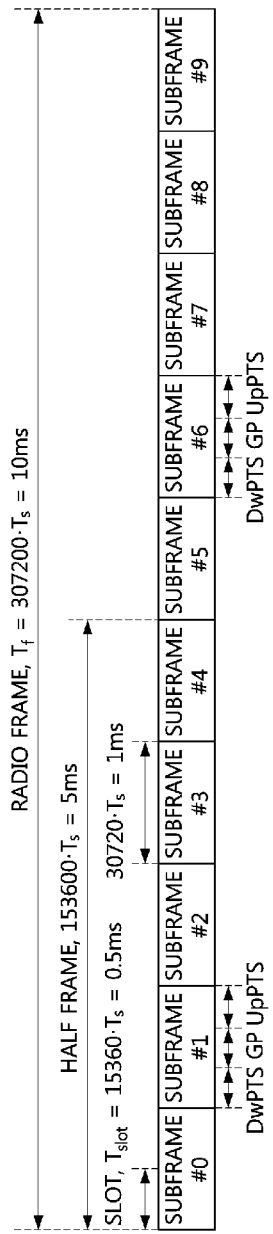
FIG. 4 is a conceptual diagram illustrating a first embodiment of a type 2 frame.

FIG. 4 is a conceptual diagram illustrating a first embodiment of a type 2 frame.

Referring to FIG. 4, a radio frame 400 may comprise two half frames, and a half frame may comprise 5 subframes. Thus, the radio frame 400 may comprise 10 subframes. The length ($T_f$) of the radio frame 400 may be 10 ms. The length of the half frame may be 5 ms. The length of the subframe may be 1 ms. Here, $T_s$ may be 1/30,720,000s.

The radio frame 400 may include at least one downlink subframe, at least one uplink subframe, and a least one special subframe. Each of the downlink subframe and the uplink subframe may include two slots. The length of a slot $T_{slot}$ may be 0.5 ms. Among the subframes included in the radio frame 400, each of the subframe #1 and the subframe #6 may be a special subframe. The special subframe may include a downlink pilot time slot (DwPTS), a guard period (GP), and an uplink pilot time slot (UpPTS).

The DwPTS may be regarded as a downlink interval and may be used for cell search, time and frequency synchronization acquisition of the terminal, and the like. The GP may be used for resolving interference problems of uplink data transmission caused by delay of downlink data reception. Also, the GP may include a time required for switching from the downlink data reception operation to the uplink data transmission operation. The UpPTS may be used for uplink channel estimation, time and frequency synchronization acquisition, and the like.

The lengths of the DwPTS, the GP, and the UpPTS included in the special subframe may be variably adjusted as needed. In addition, the number and position of each of the downlink subframe, the uplink subframe, and the special subframe included in the radio frame 400 may be changed as needed.

Figure 5:
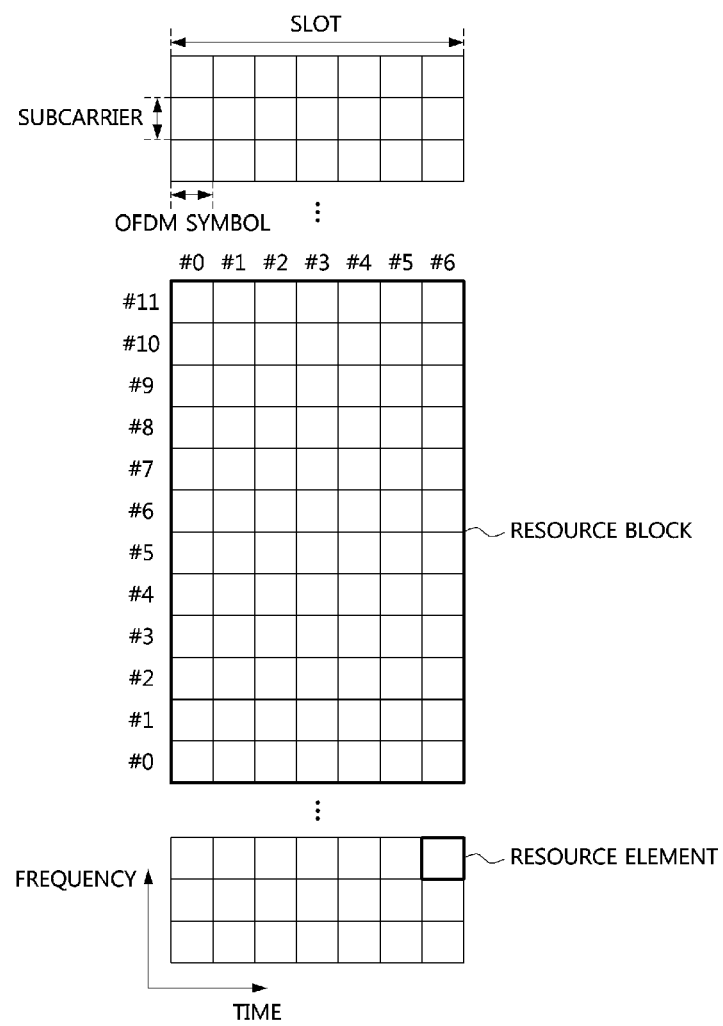
FIG. 5 is a conceptual diagram illustrating a first embodiment of a resource grid of a slot included in a subframe.

FIG. 5 is a conceptual diagram illustrating a first embodiment of a resource grid of a slot included in a subframe.

Referring to FIG. 5, a resource block (RB) of a slot included in a downlink subframe or an uplink subframe may be composed of 7 OFDM symbols in the time domain and 12 subcarriers in the frequency domain when the normal CP is used. Each of the 7 OFDM symbols may be referred to as symbol #0, symbol #1, symbol #2, symbol #3, symbol #4, symbol #5, symbol #6 and symbol #7. Each of the 12 subcarriers may be referred to as subcarrier #0, subcarrier #1, subcarrier #2, subcarrier #3, subcarrier #4, subcarrier #5, subcarrier #6, subcarrier #7, subcarrier #8, subcarrier #9, subcarrier #10 and subcarrier #11. In this case, a resource constituted by one OFDM symbol in the time domain and one subcarrier in the frequency domain may be referred to as a 'resource element (RE)'.

Figure 6:
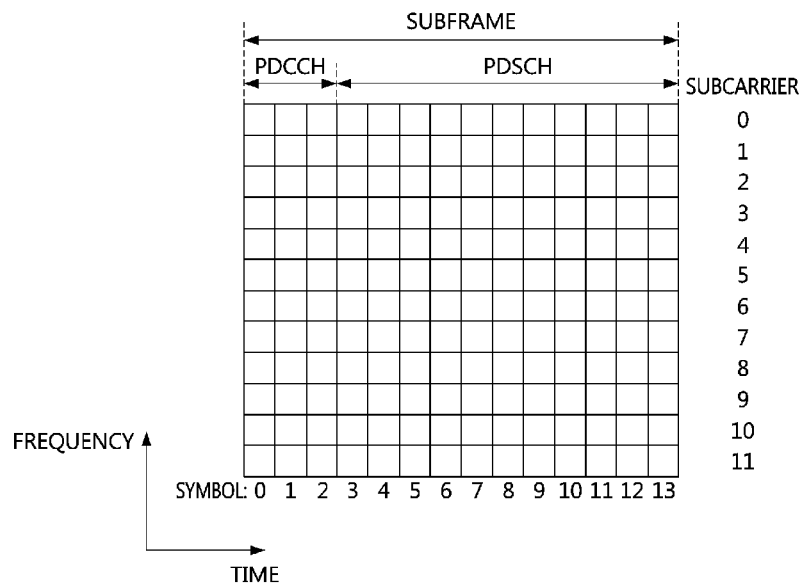
FIG. 6 is a block diagram illustrating a first embodiment of a downlink subframe in a cellular communication system.

FIG. 6 is a block diagram illustrating a first embodiment of a downlink subframe in a cellular communication system.

Referring to FIG. 6, the downlink subframe may comprise a control channel (e.g., a physical downlink control channel (PDCCH)), a data channel (e.g., physical downlink shared channel (PDSCH)), etc. When the normal CP is used, the downlink subframe may be composed of 14 OFDM symbols in the time domain, and the PDCCH of the downlink subframe may be composed of 3 OFDM symbols in the time domain, and the PDSCH of the downlink subframe may be composed of 11 OFDM symbols in the time domain.

The PDCCH may be distributed over the entire system band supported by the cellular communication system, and the PDSCH may be transmitted on a RB basis. Here, an RB may be composed of 7 OFDM symbols in the time domain and 12 subcarriers in the frequency domain. The number of subcarriers included in an RB may vary depending on the size of the system band supported by the cellular communication system.

The base station may transmit control information (for example, AMC information, scheduling information, and the like) and data units to the terminal on a downlink subframe basis. For example, the base station may transmit control information over the PDCCH and may transmit the data units via the PDSCH. The terminal may acquire the control information by decoding the PDCCH, and may acquire the data units by decoding the PDSCH based on the obtained control information. On the contrary, when the PDCCH is not decoded or there is no scheduling information for the terminal in the decoded PDCCH, the terminal may determine that a data unit for the terminal does not exist in the downlink subframe scheduled by the PDCCH.

Here, the resource through which the control information is transmitted may be limited to the PDCCH of the downlink subframe. Accordingly, when the MIMO transmission technique, the superposition transmission technique, or the like is used in the cellular communication system, much control information should be transmitted through the PDCCH, and thus resources for transmitting the control information may become insufficient. In particular, resources for transmitting the control information in a broadband communication system (e.g., a communication system supporting hundreds of MHz or a few GHz bandwidth) may become even more scarce. In addition, since reference signals are transmitted through the downlink subframe and the control information cannot be transmitted in the REs through which the reference signals are transmitted, resources for transmitting the control information may be further insufficient. When the normal CP is used and 4 antenna ports are used, the reference signal pattern in the subframe may be as follows.

Figure 7:
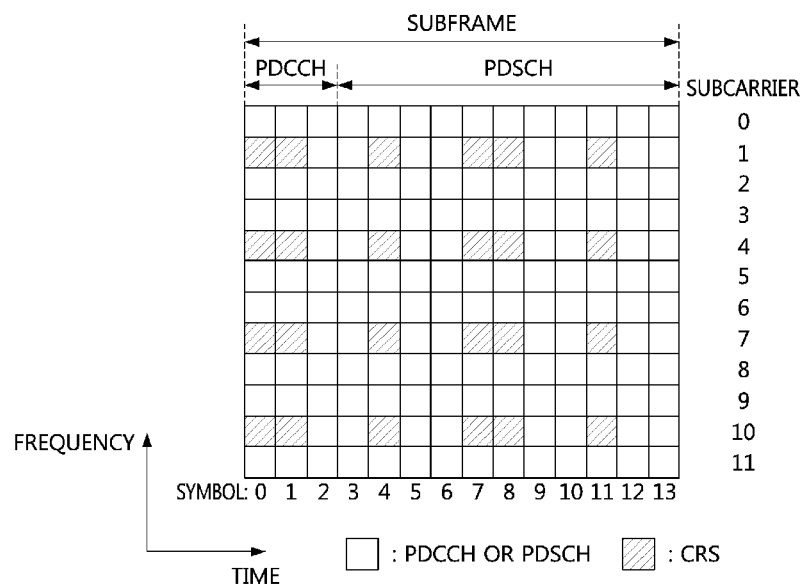
FIG. 7 is a conceptual diagram illustrating a first embodiment of a reference signal pattern in a cellular communication system.

FIG. 7 is a conceptual diagram illustrating a first embodiment of a reference signal pattern in a cellular communication system.

Referring to FIG. 7, a common reference signal or a cell-specific reference signal (CRS) may be transmitted through symbol #0, symbol #1, symbol #4, symbol #7, symbol #8 and symbol #11 in the time domain of the subframe, and subcarrier #1, subcarrier #4, subcarrier #7, and subcarrier #10 in the frequency domain of the subframe. The CRS transmitted through the region of the PDCCH may be used for channel estimation for decoding the control information, and the CRS transmitted through the region of the PDSCH may be used for channel state information acquisition and channel estimation for decoding the data units. The CRS may be allocated to the same REs in the RBs and the number of REs to which the CRS is allocated may be increased as the number of antenna ports increases.

As the number of REs to which the CRS is allocated increases with increasing number of antenna ports in a cellular communication system, the number of REs used for transmission of the control information and data units in a RB may be reduced. Thus, the data rate of data units may be decreased. In order to solve this problem, reference signals used for channel state information acquisition and channel estimation for decoding data units need to be newly defined. For example, the reference signal pattern in the subframe may be as follows.

Figure 8:
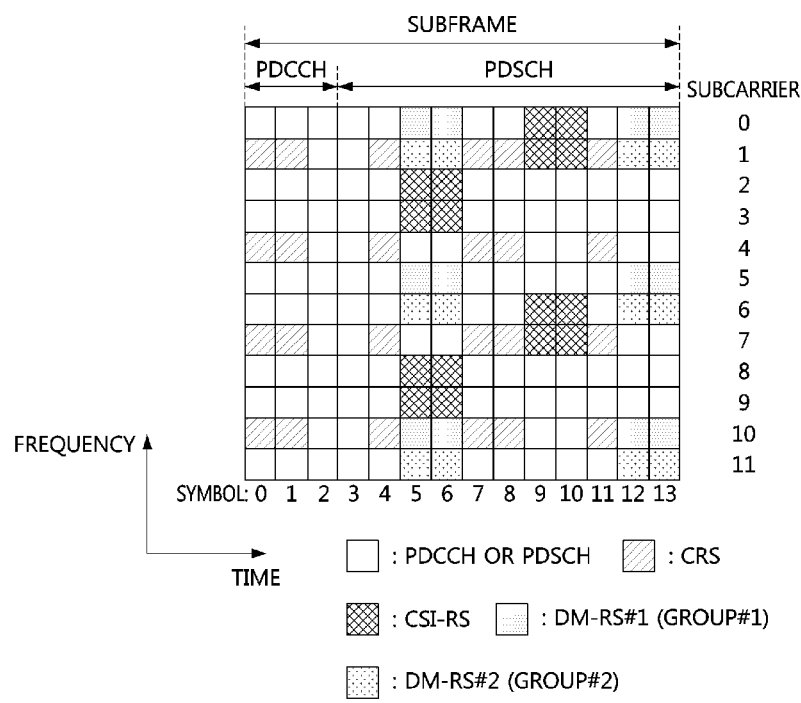
FIG. 8 is a conceptual diagram illustrating a second embodiment of a reference signal pattern in a cellular communication system.

FIG. 8 is a conceptual diagram illustrating a second embodiment of a reference signal pattern in a cellular communication system.

Referring to FIG. 8, similarly to the pattern shown in FIG. 7, the CRS may be transmitted through symbol #0, symbol #1, symbol #4, symbol #7, symbol #8 and symbol #11 in the time domain of the subframe, and subcarrier #1, subcarrier #4, subcarrier #7, and subcarrier #10 in the frequency domain of the subframe. Additionally, a channel state information-reference signal (CSI-RS) may be used for channel state information acquisition, and may not be transmitted in all subframes. For example, the CSI-RS may be transmitted with a periodicity of 5 ms. The CSI-RS may be transmitted through symbol #5, symbol #6, symbol #9 and symbol #10 in the time domain of the subframe and subcarriers #0 to #3 and subcarrier #6 to #9 in the frequency domain of the subframe.

A demodulation-reference signal (DM-RS) may be used for the decoding operation of the data units received via the PDSCH. The DM-RS may be classified into DM-RS #1 belonging to a group #1 (for example, code division multiplexing (CDM) group #1) and DM-RS #2 belonging to a group #2 (for example, CDM group #2). The DM-RS #1 may be transmitted through symbol #5, symbol #6, symbol #12 and symbol #13 in the time domain of the subframe, and subcarrier #0, subcarrier #5, and subcarrier #10 in the frequency domain of the subframe. The DM-RS #2 may be transmitted through symbol #5, symbol #6, symbol #12, and symbol #13 in the time domain of the subframe, and subcarrier #1, subcarrier #6, and subcarrier #11 in the frequency domain of the subframe.

The DM-RSs (e.g., DM-RS #1 and DM-RS #2) belonging to each of the groups are multiplexed as reference signals for a plurality of layers based on orthogonal cover code (OCC). For example, in a case of transmission of 4 layers, OCCs of length 2 may be applied to 2 DM-RSs consecutive in the time domain, so that 2 different DM-RSs may be multiplexed for each group. In a case of transmission of 8 layers, OCCs of length 4 may be applied to 4 DM-RSs consecutive in the time domain, so that 4 different DM-RSs may be multiplexed for each group. In a case of transmission of one or two layers, only the group #1 may be used as DM-RS of each layer, so that the REs to which the group #2 (e.g., DM-RS #2) is mapped may be used for transmission of data units. The DM-RS for each layer may be transmitted using precoding set for the layer. Therefore, the terminal can decode the data unit without information on the precoding applied in the base station, and even when the number of antenna ports increases, the number of REs to which the reference signals (e.g., DM-RS) may not be increased. However, since unnecessary resources may be used for transmission of reference signals in an environment where a change in channel state is small, a method of adaptively allocating resources for reference signals in consideration of a change in a channel state to improve a data rate for data units.

Meanwhile, in a cellular communication system supporting wide band transmission (e.g., several hundreds MHz or several GHz bandwidth), the base station may allocate frequency bands of several tens of MHz to several hundreds of MHz to a single terminal. A basic unit of scheduling is a RB, and a base station may allocate a plurality of consecutive RBs to a single terminal. That is, when the frequency bandwidth used in the cellular communication system is increased, the base station may allocate a plurality of consecutive RBs to one terminal.

When the AMC technique is used in a cellular communication system, different MCS levels may be applied to each of a plurality of consecutive RBs allocated to a single terminal. In this case, a separate DCI may be generated for each RB to which different MCS levels are applied, and a plurality of DCIs may be transmitted to the terminal even though a plurality of consecutive RBs are allocated to one terminal. Therefore, the control information transmitted to the terminal may be increased remarkably.

Next, operation methods of a communication node for reducing the overhead of the control information will be described. In the following description, when a method (e.g., transmission or reception of a signal) to be performed at a first communication node among the communication nodes is described, the corresponding second communication node may perform a method corresponding to the method performed at the first communication node (e.g., reception or transmission of the signal). That is, when the operation of the terminal is described, it may possible for the base station to perform an operation corresponding to the operation of the terminal. Conversely, when the operation of the base station is described, the corresponding terminal may perform an operation corresponding to the operation of the base station.

Figure 9:
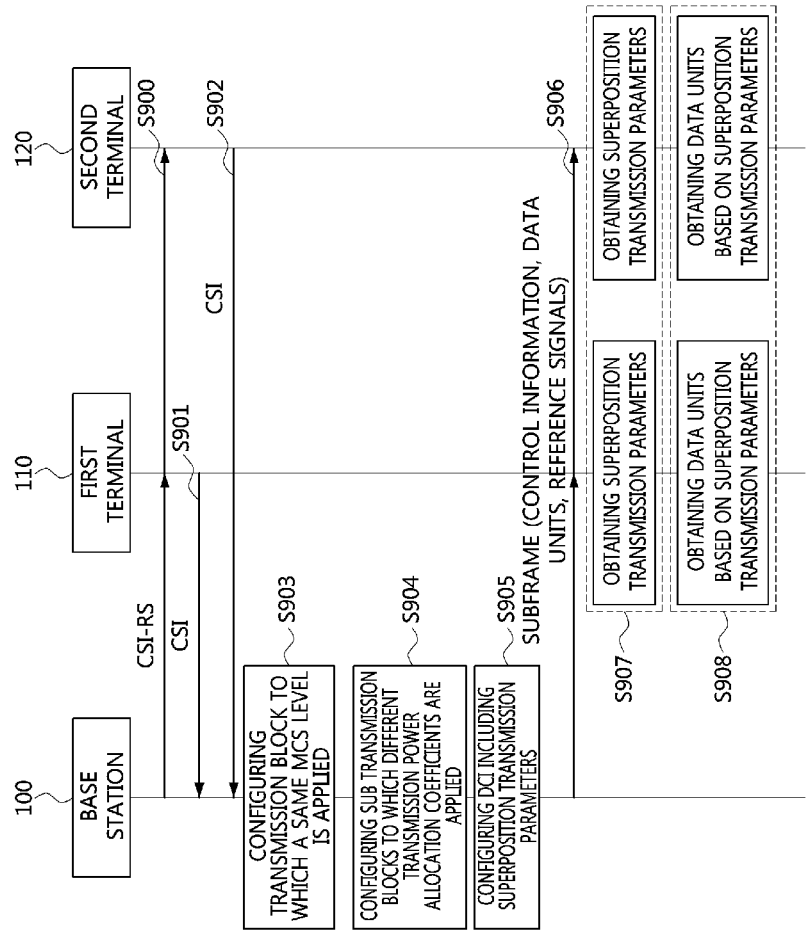
FIG. 9 is a sequence chart illustrating operation methods of communication nodes in a cellular communication system.

FIG. 9 is a sequence chart illustrating operation methods of communication nodes in a cellular communication system.

Referring to FIG. 9, the cellular communication system may comprise the base station 100, the first terminal 110, and the second terminal 120, and may support a 4G communication technology, a 5G communication technology, or the like. For example, the cellular communication network may support superposition transmission technology (e.g., NOMA technology). Each of the base station 100, the first terminal 110, and the second terminal 120 shown in FIG. 9 may be identical to the base station 100, the first terminal 110 and the second terminal 120 shown in FIG. 1, and may be configured the same as the communication node 200 shown in FIG. 2. For example, each of the first terminal 110 and the second terminal 120 may be located within cell coverage of the base station 100 and may be connected to the base station 100.

The base station 100 may transmit a CSI-RS (e.g., CSI-RS in FIG. 8) through a downlink subframe according to a predetermined period (S900). Each of the first terminal 110 and the second terminal 120 may receive the CSI-RS from the base station 100, and perform a channel measurement operation based on the received CSI-RS. Here, a channel between the base station 100 and the first terminal 110 may be referred to as a "first channel", and a channel between the base station 100 and the second terminal 120 may be referred to as a "second channel". The first terminal 110 may transmit measurement information (e.g., CSI) of the first channel to the base station 100 (S901), and the second terminal 120 may transmit measurement information of the second channel (e.g., CSI) to the base station 100 (S902).

The base station 100 may receive the measurement information of the first channel from the first terminal 110 and may receive the measurement information of the second channel from the second terminal 120. Alternatively, the base station 100 may acquire the measurement information of the first channel by performing a channel measurement operation based on the SRS transmitted from the first terminal 110, and may acquire measurement information of the second channel by performing a channel measurement operation based on the SRS transmitted from the second terminal 120.

The base station 100 may configure a transmission block (TB) for superposition transmission by using the measurement information of the first channel and the second channel (S903). A basic unit of the TB is a RB, and the TB may include a plurality of consecutive RBs. The number of RBs included in the TB may be determined based on the channel state. For example, if a change of the channel state is relatively small in the frequency domain, the TB may include a relatively larger number of RBs. On the contrary, if there is a relatively large change in the channel state in the frequency domain, the RB may include relatively fewer RBs.

Also, in order to prevent a plurality of DCIs from being used due to different MCS levels, the same MCS level may be applied to a plurality of consecutive RBs included in the TB. Therefore, the base station 100 may determine the size of the TB so that the same MCS level is applied to the plurality of consecutive RBs included in the TB, and determine the MCS level applied to the determined TB. Since the same MCS level is applied to the plurality of consecutive RBs included in the TB, only one DCI may be used for the TB, and therefore, a complexity of decoding operations for the TB may be reduced at the side of the terminals 110 and 120.

The size of the TB may be the system bandwidth supported by the base station 100. In this case, since the base station 100 and the terminals 110 and 120 already know the size of the TB, the operation of configuring the TB based on the measurement information of the first channel and the second channel may be omitted. However, even if the step S903 is omitted, the base station 100 may determine one MCS level applied to the system bandwidth (for example, the TB) in consideration of the measurement information of the first channel and the second channel.

The base station may configure at least one sub-transmission block (sub-TB) for superposition transmission using the measurement information of the first channel and the second channel (S904). The TB may include a plurality of sub-TBs, and a basic unit of the sub-TB may be a RB, and each of the plurality of sub-TBs may include at least one consecutive RB. A same transmit power allocation coefficient may be applied to at least one consecutive RB included in the sub-TB, and different transmit power allocation coefficients may be applied respectively to the plurality of sub-TBs. That is, the base station may determine the size of the sub-TB including at least one consecutive RB to which a same transmit power allocation coefficient is applied, taking into consideration the channel state indicated by the measurement information of the first channel and the second channel, and determine a transmit power allocation coefficient to be applied to the determined sub-TB.

For example, the base station 100 may configure a sub-TB to have at least one RB having a change in channel state within a predetermined range, and configure the transmit power allocation coefficient for the sub-TB in consideration of the change in the channel state. Therefore, when the change in the channel state is small in the frequency domain, the number of RBs included in the sub-TB may be increased, and when there is a large change in the channel state in the frequency domain, the number of RBs included in the sub-TB may be decreased. The change in the channel state within the TB may be reflected by using different transmit power allocation coefficients for respective sub-TBs.

For example, a TB including a plurality of sub-TBs may be configured as follows.

Figure 10:
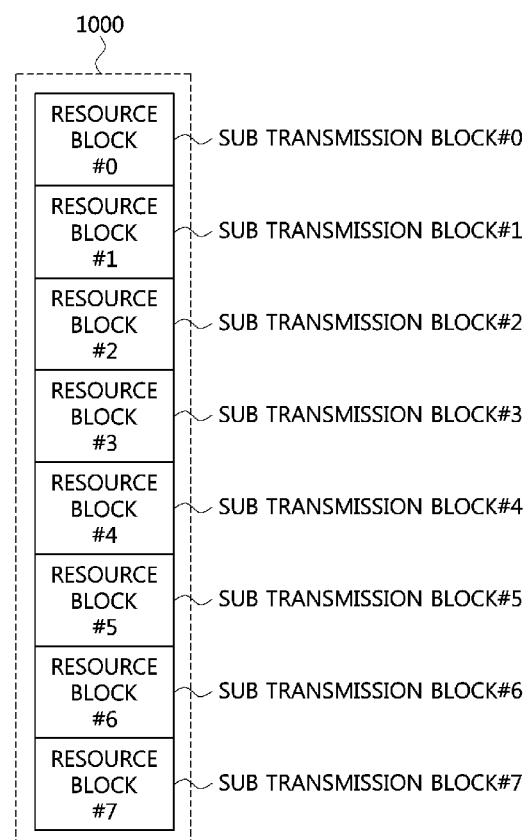
FIG. 10 is a conceptual diagram illustrating a first embodiment of a transmission block in a cellular communication system.

FIG. 10 is a conceptual diagram illustrating a first embodiment of a transmission block in a cellular communication system.

Referring to FIG. 10, the base station 100 may a TB 1000 comprising 8 sub-TBs (e.g., sub-TBs #0 to #7) for superposition transmission of the first terminal 110 and the second terminal 120, and may determine a MCS level commonly applied to the 8 sub-TBs included in the TB 1000. Also, the base station 100 may configure each of the sub-TBs to include one RB, and may determine transmit power allocation coefficients differently for the respective sub-TBs in consideration of channel states indicated by the measurement information of the first channel and the second channel. If the relation between the channel matrix of the first channel and the channel matrix of the second channel satisfies Equation 4, the transmit power allocation coefficients for the respective sub-TBs may be configured based on Table 2 below. Here, $\alpha_1$ may be a transmit power allocation coefficient for the first terminal 110, and $\alpha_2$ may be a transmit power allocation coefficient for the second terminal 120. Also, $\alpha_1 + \alpha_2$ may be 1 for each sub-TB.

TABLE 2

| | Transmit power allocation coefficients | |
|---|---|---|
| | $\alpha_1$ | $\alpha_2$ |
| Sub-TB #0 | 0.8 | 0.2 |
| Sub-TB #1 | 0.85 | 0.15 |
| Sub-TB #2 | 0.9 | 0.1 |
| Sub-TB #3 | 0.95 | 0.05 |
| Sub-TB #4 | 0.97 | 0.03 |
| Sub-TB #5 | 0.98 | 0.02 |
| Sub-TB #6 | 0.99 | 0.01 |
| Sub-TB #7 | 0.999 | 0.001 |

Figure 11:
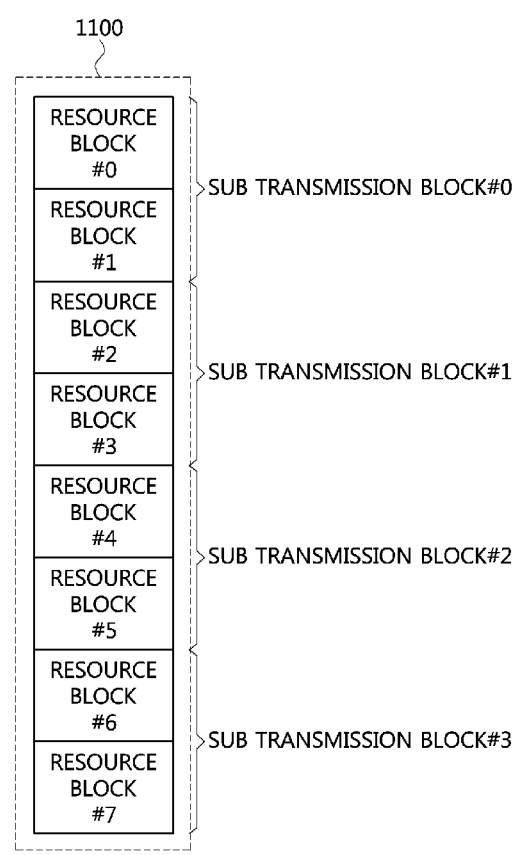
FIG. 11 is a conceptual diagram illustrating a second embodiment of a transmission block in a cellular communication system.

FIG. 11 is a conceptual diagram illustrating a second embodiment of a transmission block in a cellular communication system.

Referring to FIG. 11, the base station 100 may a transmission block 1100 comprising 4 sub-TBs (e.g., sub-TBs #0 to #3) for superposition transmission of the first terminal 110 and the second terminal 120, and may determine a MCS level commonly applied to the 4 sub-TBs included in the TB 1100. Also, the base station 100 may configure each of the sub-TBs to include two consecutive RBs. For example, the sub-TB #0 may include RBs #0 and #1, the sub-TB #1 may include RBs #2 and #3, the sub-TB #2 may include RBs #4 and #5, and the sub-TB #3 may include RBs #6 and #7.

The base station 100 may respectively configure different transmit power allocation coefficients for the sub-TBs by reflecting the channel states (e.g., changes of the channel states) indicated by the measurement information of the first channel and the second channel If the relation between the channel matrix in the first channel and the channel matrix in the second channel satisfies Equation 4, the transmit power allocation coefficients may be configured based on Table 3 below. $\alpha_1$ may be the transmit power allocation coefficient for the first terminal 110, and $\alpha_2$ may be a transmit power allocation coefficient for the second terminal 120. Also, $\alpha_1 + \alpha_2$ may be 1 for each sub-TB.

TABLE 3

| | Transmit power allocation coefficients | |
|---|---|---|
| | $\alpha_1$ | $\alpha_2$ |
| Sub-TB #0 | 0.8 | 0.2 |
| Sub-TB #1 | 0.85 | 0.15 |
| Sub-TB #2 | 0.9 | 0.1 |
| Sub-TB #3 | 0.95 | 0.05 |

Referring again to FIG. 9, the base station 100 may configure a DCI including parameters (hereinafter referred to as 'superposition transmission parameters') needed for the superposition transmission (S905). The superposition transmission parameters may include at least one of information indicating the size of the TB, information indicating the size of the sub-TB, information indicating the transmit power allocation coefficients, and information indicating increment or decrement of the transmit power allocation coefficients. Also, when the size of the TB is known in advance to the base station 100 and the terminals 110 and 120 (e.g., when the size of the TB is equal to the system bandwidth supported by the base station 100), the DCI may include at least one of information indicating the size of the sub-TB, information indicating the transmit power allocation coefficients, and information indicating increment or decrement of the transmit power allocation coefficients.

The DCI may include information indicating the size of the TB described in Table 4 below. In this case, a separate DCI including the information indicating the size of the TB may not be used, and information indicating the size of the TB may be additionally included in an existing DCI (e.g., DCI described in Table 1). The number of bits of the information indicating the size of the TB may be determined according to the system bandwidth, and the size of the DCI may vary according to the number of bits of the information indicating the size of the TB. Alternatively, the information indicating the size of the TB may be transmitted via system information (SI) instead of the DCI. For reference, Table 4 is briefly made for convenience of explanation, and various embodiments are not limited to Table 4.

TABLE 4

| The number of bits of information indicating the size of the TB in SI or DCI. | value | The size of TB (unit of 4 RBs) | The size of TB (unit of 8 RBs) |
|---|---|---|---|
| 2 | 00 | 4 RBs | 8 RBs |
|   | 01 | 8 RBs | 16 RBs |
|   | 10 | 12 RBs | 24 RBs |
|   | 11 | 16 RBs | 32 RBs |
| 3 | 000 | 4 RBs | 8 RBs |
|   | 001 | 8 RBs | 16 RBs |
|   | 010 | 12 RBs | 24 RBs |
|   | 011 | 16 RBs | 32 RBs |
|   | 100 | 20 RBs | 40 RBs |
|   | 101 | 24 RBs | 48 RBs |
|   | 110 | 28 RBs | 56 RBs |
|   | 111 | 32 RBs | 64 RBs |

For example, in the cases illustrated in FIG. 10 and FIG. 11, the information indicating the size of the TB may be set to '01' or '001' when the size of the TB is represented in units of 4 RBs, and may be set to '00' or '000' when the size of the TB is represented in units of 8 RBs based on Table 4.

Also, the DCI may include information indicating the size of the sub-TB described in Table 5 below. In this case, a separate DCI including the information indicating the size of the sub-TB may not be used, and information indicating the size of the sub-TB may be additionally included in an existing DCI (e.g., DCI described in Table 1). The number of bits of the information indicating the size of the sub-TB may be determined according to the system bandwidth, and the size of the DCI may vary according to the number of bits of the information indicating the size of the sub-TB. Alternatively, information indicating the size of the sub-TB may be transmitted via SI instead of the DCI. For reference, Table 5 is briefly made for convenience of explanation, and various embodiments are not limited to Table 5.

TABLE 5

| The number of bits of information indicating the size of the sub-TB in SI or DCI. | value | The size of sub-TB (unit of 1 RB) | The size of sub-TB (unit of 2 RBs) |
|---|---|---|---|
| 2 | 00 | 1 RBs | 2 RBs |
|   | 01 | 2 RBs | 4 RBs |
|   | 10 | 3 RBs | 6 RBs |
|   | 11 | 4 RBs | 8 RBs |
| 3 | 000 | 1 RBs | 2 RBs |
|   | 001 | 2 RBs | 4 RBs |
|   | 010 | 3 RBs | 6 RBs |
|   | 011 | 4 RBs | 8 RBs |
|   | 100 | 5 RBs | 10 RBs |
|   | 101 | 6 RBs | 12 RBs |
|   | 110 | 7 RBs | 14 RBs |
|   | 111 | 8 RBs | 16 RBs |

For example, in the case illustrated in FIG. 10, the information indicating the size of the sub-TB may be set to '00' or '000' based on Table 5. Also, in the case illustrated in FIG. 11, the information indicating the size of the sub-TB may be set to '01' or '001' when the size of the sub-TB is represented in unit of 1 RB, and may be set to '00' or '000' when the size of the sub-TB is represented in units of 2 RBs based on Table 5.

Also, the DCI may include the information indicating transmit power allocation coefficients ($\alpha_1$, $\alpha_2$) described in Table 6 below. Since the relation between $\alpha_1$ and $\alpha_2$ is "$\alpha_1+\alpha_2=1$", the DCI may include information indicating only one of $\alpha_1$ and $\alpha_2$. In this case, a separate DCI including the information indicating transmit power allocation coefficients may not be used, and the information indicating transmit power allocation coefficients may be additionally included in an existing DCI (e.g., DCI described in Table 1). Here, the number of bits of the information indicating the transmit power allocation coefficients may be determined according to quantization level for them, and the size of the DCI may vary according to the number of bits of the information indicating the transmit power allocation coefficients. For reference, Table 6 is briefly made for convenience of explanation, and various embodiments are not limited to Table 6.

TABLE 6

| The number of bits of information indicating the transmit power allocation coefficients in DCI. | value | $\alpha_1$ or $\alpha_2$ |
|---|---|---|
| 3 | 000 | 0.2 |
|   | 001 | 0.15 |
|   | 010 | 0.1 |
|   | 011 | 0.05 |
|   | 100 | 0.03 |
|   | 101 | 0.02 |
|   | 110 | 0.01 |
|   | 111 | 0.001 |

For example, in the case illustrated in FIG. 10, the information indicating the transmit power allocation coefficients for the sub-TBs #0 to #7 may be set to '000', '001', '010', '011', '100', '101', '110', and '111' based on Table 6. Also, in the case illustrated in FIG. 11, the information indicating the transmit power allocation coefficients for the sub-TBs #0 to #3 may be set to '010', '011', '100', and '101' based on Table 6.

Meanwhile, when the transmit power allocation coefficients are set based on Table 6, the information indicating the transmit power allocation coefficients for each sub-TB should be included in the DCI, and thus the size of the DCI may be increased. For example, 24 bits (e.g., 3 bits×8) are required to indicate the transmit power allocation coefficients for the sub-TBs #0 to #7 shown in FIG. 10, 12 bits (e.g., 3 bits×4) are required to indicate the transmit power allocation coefficients for the sub-TBs #0 to #3 shown in FIG. 11.

In order to resolve such the problem, the DCI may include information indicating the transmit power allocation coefficients of the first sub-TB (e.g., the sub-TB #0 in FIG. 10 and FIG. 11) among the plurality of sub-TBs included in the TB, and information indicating increment or decrement of the transmit power allocation coefficients for the remaining sub-TBs (e.g., the sub-TBs #1 to #7 in FIG. 10 and the sub-TBs #1 to #3 in FIG. 11) excluding the first sub-TB among the plurality of sub-TBs included in the TB. Therefore, 6 bits (e.g., 3 bits (from Table 6)+3 bits (from Table 7)) may be required to indicate the transmit power allocation coefficients for the sub-TBs shown in FIG. 10 or FIG. 11.

Also, a separate DCI including the information indicating the transmit power allocation coefficients and the information indicating increment or decrement of the transmit power allocation coefficients may not be used, and the information indicating the transmit power allocation coefficients and the information indicating increment or decrement of the transmit power allocation coefficients may be additionally included in an existing DCI (e.g., DCI described in Table 1). Therefore, the overhead of the control information may be reduced. The information indicating the increment or decrement of the transmit power allocation coefficients included in the existing DCI may be set based on Table 7 below. Here, the number of bits of the information indicating the increment or decrement of the transmit power allocation coefficients may be determined according to the quantization level, and the size of the DCI may vary according to the number of bits of the information indicating the increment or decrement of the transmission power allocation coefficients. For reference, Table 7 is briefly made for convenience of explanation, and various embodiments are not limited to Table 7.

TABLE 7

| The number of bits of information indicating the increment or decrement of the transmit power allocation coefficients in DCI. | value | Increment or decrement |
|---|---|---|
| 3 | 000 | −0.05 |
|  | 001 | −0.01 |
|  | 010 | −0.005 |
|  | 011 | −0.001 |
|  | 100 | +0.001 |
|  | 101 | +0.005 |
|  | 110 | +0.01 |
|  | 111 | +0.05 |

For example, in the case illustrated in FIG. 10, the information indicating the transmit power allocation coefficients for the sub-TB #0 may be set to '000' based on Table 6, and the information indicating the increment or decrement of the transmit power allocation coefficients for the sub-TBs #1 to #7 may be set to '001' based on Table 7. Accordingly, $\alpha_2$ for the sub-TBs #0 to #7 may be set to '0.2', '0.19', '0.18', '0.17', '016', '0.15', '0.14', and '0.13', respectively. Also, $\alpha_1$ for the sub-TBs #0 to #7 may be set to '0.8', '0.81', '0.82', '0.83', '084', '0.85', '0.86', and '0.87', respectively.

Also, in the case illustrated in FIG. 11, the information indicating the transmit power allocation coefficients for the sub-TB #0 may be set to '010' based on Table 6, and the information indicating the increment or decrement of the transmit power allocation coefficients for the sub-TBs #1 to #7 may be set to '110' based on Table 7. Accordingly, $\alpha_2$ for the sub-TBs #0 to #7 may be set to '0.1', '0.11', '0.12', '0.13', '014', '0.15', '0.16', and '0.17', respectively. Also, $\alpha_1$ for the sub-TBs #0 to #7 may be set to '0.9', '0.89', '0.88', '0.87', '086', '0.85', '0.84', and '0.83', respectively.

Meanwhile, a quantization error for the transmit power allocation coefficients may be generated according to Table 6, and a quantization error for the increment or decrement of the transmit power allocation coefficients may be generated according to Table 7. The effect of increasing the data rate of data units may not be large due to the quantization error. In order to resolve such the problem, information indicating the transmit power allocation coefficients may be transmitted to the terminals 110 and 120 via reference signals (e.g., DM-RS) instead of DCI. In this case, the base station 100 may configure DM-RSs used for transmitting the information indicating transmit power allocation coefficients.

For example, the DM-RS #1 for the first terminal 110 may be transmitted using a power calculated based on Equation 6 below. In this case, the first terminal 110 may estimate the transmit power allocation coefficients based on the received signal strength of the DM-RS #1. Also, the DM-RS #2 for the second terminal 120 may be transmitted using a power calculated based on Equation 7 below. In this case, the second terminal 120 may estimate the transmit power allocation coefficients based on the received signal strength of the DM-RS #2. The DM-RS #1 and the DM-RS #2 used for decoding the superimposed signal may be transmitted so as to be orthogonal to each other.

$$\text{conventional transmit power of DM-RS} \times \alpha_1 \qquad \text{[Equation 6]}$$

$$\text{conventional transmit power of DM-RS} \times \alpha_2 \qquad \text{[Equation 7]}$$

The DM-RS used for transmission of the transmit power allocation coefficients $\alpha_1$ and $\alpha_2$ may be configured as follows.

Figure 12:
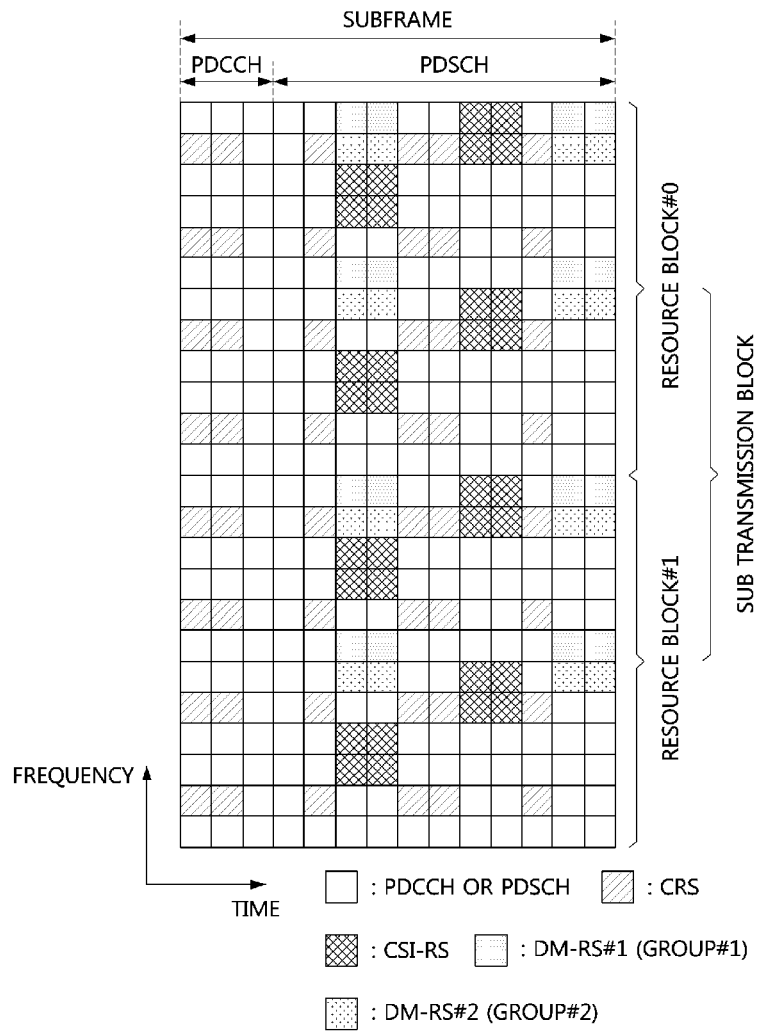
FIG. 12 is a conceptual diagram illustrating a third embodiment of a reference signal pattern in a cellular communication system.

FIG. 12 is a conceptual diagram illustrating a third embodiment of a reference signal pattern in a cellular communication system.

Referring to FIG. 12, the sub-TB may comprise 2 consecutive RBs in the frequency domain, and may correspond to each of the sub-TBs #0 to #3 shown in FIG. 11. Each of the CRS, CSI-RS, DM-RS #1 and DM-RS #2 positioned in the REs of the sub-TB may correspond to the CRS, CSI-RS, DM-RS #1, and DM-RS #2 illustrated in FIG. 8. The number of REs allocated for the DM-RSs (e.g., DM-RS #1, DM-RS #2) in the sub-TB may be two-thirds of the number of REs allocated for DM-RS in the sub-TB of the existing LTE-A system.

In the case of transmission of 4 layers, the OCCs of length 2 may be applied to 2 DM-RSs consecutive in the time domain, so that 2 different DM-RSs may be multiplexed for each group. In the case of transmission of 8 layers, the OCCs of length 4 may be applied to 4 consecutive DM-RSs in the time domain, so that 4 different DM-RSs may be multiplexed for each group. In this case, $\alpha_1$ may be applied to all DM-RS #1 belonging to the group #1, and $\alpha_2$ may be applied to all DM-RS #2 belonging to the group #2. For example, the DM-RS #1 may be transmitted using the power calculated based on Equation 6, and the DM-RS #2 may be transmitted using the power calculated based on Equation 7.

Here, the DM-RS #1 and DM-RS #2 may be set to be orthogonal to each other. Some of the REs configured for the DM-RS #1 and DM-RS #2 may be used for transmission of data units, since the error of the channel estimation becomes small when the change of the channel state in the frequency domain is small. Alternatively, the REs for the DM-RS #1 and DM-RS #2 may be allocated less in the time domain or the frequency domain. Meanwhile, the precoding and transmit power allocation coefficients may be used identically in the transmission of the layers. In this case, the terminals 110 and 120 can decode the data units even if they do not know the precoding and the transmit power allocation coefficients used by the base station 100.

Figure 13:
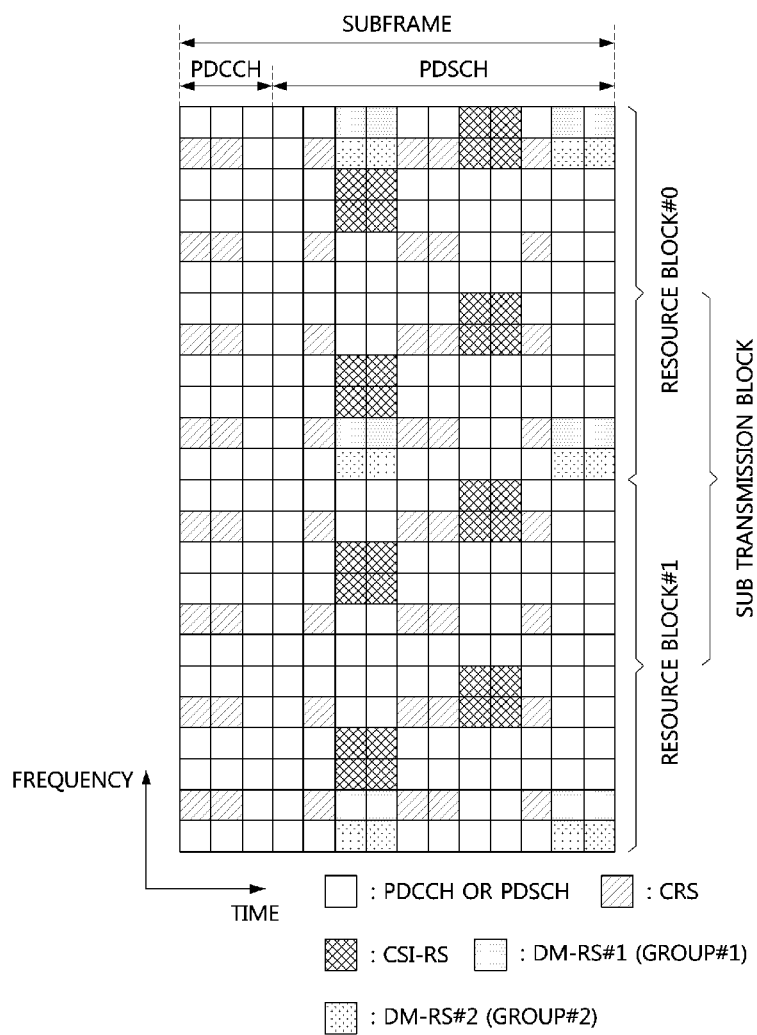
FIG. 13 is a conceptual diagram illustrating a fourth embodiment of a reference signal pattern in a cellular communication system.

FIG. 13 is a conceptual diagram illustrating a fourth embodiment of a reference signal pattern in a cellular communication system.

Referring to FIG. 13, the sub-TB may comprise 2 consecutive RBs in the frequency domain, and may correspond to each of the sub-TBs #0 to #3 shown in FIG. 11. Each of the CRS, CSI-RS, DM-RS #1 and DM-RS #2 positioned in the REs of the sub-TB may correspond to the CRS, CSI-RS, DM-RS #1, and DM-RS #2 illustrated in FIG. 8. The number of REs allocated for the DM-RSs (e.g., DM-RS #1, DM-RS #2) in the sub-TB may be one half of the number of REs allocated for DM-RS in the sub-TB of the existing LTE-A system.

The number of REs used for DM-RS transmission in the sub-TB may be determined based on a change in channel state in the frequency domain. For example, if the channel state change in the sub-TB shown in FIG. 13 is smaller than the channel state change in the sub-TB shown in FIG. 12, the number of REs used for DM-RS transmission in the sub-TB shown in FIG. 13 may be smaller than the number of REs used for DM-RS transmission in the sub-transmission block shown in FIG. 12.

In the case of transmission of 4 layers, the OCCs of length 2 may be applied to 2 DM-RSs consecutive in the time domain, so that 2 different DM-RSs may be multiplexed for each group. In the case of transmission of 8 layers, the OCCs of length 4 may be applied to 4 consecutive DM-RSs in the time domain, so that 4 different DM-RSs may be multiplexed for each group. In this case, $\alpha_1$ may be applied to all DM-RS #1 belonging to the group #1, and $\alpha_2$ may be applied to all DM-RS #2 belonging to the group #2. For example, the DM-RS #1 may be transmitted using the power calculated based on Equation 6, and the DM-RS #2 may be transmitted using the power calculated based on Equation 7.

Here, the DM-RS #1 and DM-RS #2 may be set to be orthogonal to each other. Some of the REs set for the DM-RS #1 and DM-RS #2 may be used for transmission of data units, since the error of the channel estimation becomes small when the change of the channel state in the frequency domain is small. Alternatively, the REs for the DM-RS #1 and DM-RS #2 may be allocated less in the time domain or the frequency domain. Meanwhile, the precoding and transmit power allocation coefficients may be used identically in the transmission of the layers. In this case, the terminals 110 and 120 can decode the data units even if they do not know the precoding and the transmit power allocation coefficients used by the base station 100.

Referring to FIG. 9, the base station 100 may transmit control information (e.g., DCI) including the superposition transmission parameters, the data units (e.g., data transmitted to the terminals 110 and 120 in a superposition transmission manner), and the reference signals to the terminals 110 and 120 (S906). If the control information does not include the information indicating the transmit power allocation coefficients, the reference signals (e.g., DM-RS) may be used for transmission of the information indicating the transmit power allocation coefficients. Here, the control information may be transmitted through the PDCCH of the subframe, and the data units may be transmitted through the PDSCH of the subframe.

The terminals 110 and 120 may receive the subframe from the base station 100 and may identify the superposition transmission parameters by decoding the DCI obtained from the PDCCH of the subframe (S907). For example, the terminals 110 and 120 may determine the size of the TB, the size of the sub-TB, and the transmit power allocation coefficients (e.g., transmit power allocation coefficients for each of the plurality of sub-TBs) based on the identified superposition transmission parameters. That is, the terminals 110 and 120 may identify the size of the TB configured for the superposition transmission based on Table 4, identify the size of the sub-TB configured for the superposition transmission based on Table 5, and identify the transmit power allocation coefficients configured for the superposition transmission based on Table 6 and Table 7.

On the other hand, when the DCI does not include the information indicating the transmit power allocation coefficients, the terminals 110 and 120 may estimate the transmit power allocation coefficients based on the received signal strength of the DM-RSs received through the subframe. For example, since the DM-RS #1 is transmitted based on the transmit power according to Equation 6, the received signal strength of the DM-RS #1 received at the first terminal 110 may be different from the received signal strength of the conventional DM-RS #1 (e.g., the received signal strength of the DM-RS #1 to which $\alpha_1$ is not applied). Therefore, the first terminal 110 may estimate $\alpha_1$ by comparing the received signal strength of the DM-RS #1 to which $\alpha_1$ is applied and the received signal strength of the DM-RS #1 to which $\alpha_1$ is not applied, and estimate $\alpha_2$ by using the relation between $\alpha_1$ and $\alpha_2$ (e.g., $\alpha_1+\alpha_2=1$).

When the first reception signal $y_1$ received from the base station 100 is represent by Equation 2, $h_1$ may be obtained based on the CSI-RS received from the base station 100, and $\alpha_1$ may be obtained based on the DCI (or, DM-RS) received from the base station 100. Thus, the first terminal 110 may decode the first reception signal $y_1$ by using $h_1$ and $\alpha_1$ so as to obtain the first downlink signal $S_1$ (e.g., data unit) (S908). Here, the first terminal 110 may regard $h_1\sqrt{\alpha_2 S_2}$ included in the first reception signal $y_1$ as noise.

For example, since the DM-RS #2 is transmitted based on the transmit power according to Equation 7, the received signal strength of the DM-RS #2 received at the second terminal 120 may be different from the received signal strength of the conventional DM-RS #2 (e.g., the received signal strength of the DM-RS #2 to which $\alpha_2$ is not applied). Therefore, the second terminal 120 may estimate $\alpha_2$ by comparing the received signal strength of the DM-RS #2 to which $\alpha_2$ is applied and the received signal strength of the DM-RS #2 to which $\alpha_2$ is not applied, and estimate $\alpha_1$ by using the relation between $\alpha_1$ and $\alpha_2$ (e.g., $\alpha_1+\alpha_2=1$).

When the second reception signal $y_2$ received from the base station 100 is represent by Equation 3, $h_2$ may be obtained based on the CSI-RS received from the base station 100, and $\alpha_1$ and $\alpha_2$ may be obtained based on the DCI (or, DM-RS) received from the base station 100. Thus, the second terminal 120 may decode the second reception signal $y_2$ by using $h_2$ and $\alpha_1$ so as to obtain the first downlink signal $S_1$, and remove $h_2\sqrt{\alpha_1 S_1}$ from the second reception signal $y_2$ by using the first downlink signal $S_1$. Then, the second terminal 120 may use $h_2$ and $\alpha_2$ so as to obtain the second downlink signal $S_2$ (e.g. data unit) from the second reception signal $y_2$ (S908).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station, in a communication system including the base station, a first terminal, and a second terminal, the operation method comprising:
dividing a transmission block used for communications in the communication system into a plurality of sub transmission blocks each of which includes at least one resource block;
setting transmit power allocation coefficients respectively for the plurality of sub transmission blocks; and
transmitting the transmission block to which a superimposed signal is mapped, the superimposed signal including information indicating a number of resource blocks included in each of the plurality of sub transmission blocks, information indicating the transmit power allocation coefficients, first data units for the first terminal, and second data units for the second terminal,
wherein the first data units and the second data units are mapped to a same resource in the transmission block, and
wherein the plurality of sub transmission blocks are configured based on a first channel state between the base station and the first terminal and a second channel state between the base station and the second terminal.

2. The operation method according to claim 1, wherein a same modulation and coding scheme (MCS) level is applied to the plurality of sub transmission blocks included in the transmission block.

3. The operation method according to claim 1, wherein the information indicating the number of resource blocks included in each of the plurality of sub transmission blocks and the information indicating the transmit power allocation coefficients are included in downlink control information (DCI) of the superimposed signal.

4. The operation method according to claim 1, wherein the first data units are transmitted using a power based on a first transmit power allocation coefficient set for the first terminal, the second data units are transmitted using a power based on a second transmit power allocation coefficient set for the second terminal, and the first transmit power allocation coefficient is different from the second transmit power allocation coefficient.

5. The operation method according to claim 1, wherein the transmit power allocation coefficients are indicated by reference signals mapped to the transmission block and a resource used for transmission of the reference signals is dynamically configured based on changes in channel states in a frequency domain.

6. The operation method according to claim 5, wherein a first reference signal for the first terminal is set to be orthogonal to a second reference signal for the second terminal, the first reference signal is transmitted using a power based on a first transmit power allocation coefficient set for the first terminal, the second reference signal is transmitted using a power based on a second transmit power allocation coefficient set for the second terminal, and the first transmit power allocation coefficient is different from the second transmit power allocation coefficient.

7. The operation method according to claim 1, wherein the superimposed signal further includes information indicating increment or decrement of transmit power allocation coefficients for remaining sub transmission blocks excluding a first sub transmission block among the plurality of sub transmission blocks, when the information indicating the transmit power allocation coefficients indicates a first transmit power allocation coefficient for the first sub transmission block among the plurality of sub transmission blocks.

8. An operation method of a first terminal in a communication system including a base station, the first terminal, and a second terminal, the operation method comprising:
receiving a transmission block to which a superimposed signal is mapped, the superimposed signal including information indicating a number of resource blocks included in each of a plurality of sub transmission blocks, information indicating transmit power allocation coefficients, first data units for the first terminal, and second data units for the second terminal, wherein the transmission block used for communications in the communication system is divided into the plurality of sub transmission blocks each of which includes at least one resource block, and the transmit power allocation coefficients are set respectively for the plurality of sub transmission blocks;
identifying the transmit power allocation coefficients based on the information indicating transmit power allocation coefficients; and
decoding the first data units from the superimposed signal by using a channel matrix between the first terminal and the base station and the transmit power allocation coefficients for the plurality of sub transmission blocks,
wherein the first data units and the second data units are mapped to a same resource in the transmission block, and
wherein the plurality of sub transmission blocks are configured based on a first channel state between the base station and the first terminal and a second channel state between the base station and the second terminal.

9. The operation method according to claim 8, wherein a same modulation and coding scheme (MCS) level is applied to the plurality of sub transmission blocks included in the transmission block.

10. The operation method according to claim 8, wherein the information indicating the number of resource blocks included in each of the plurality of sub transmission blocks and the information indicating the transmit power allocation coefficients are included in downlink control information (DCI) of the superimposed signal.

11. The operation method according to claim 8, wherein the first data units are transmitted using a power based on a first transmit power allocation coefficient set for the first terminal, the second data units are transmitted using a power based on a second transmit power allocation coefficient set for the second terminal, and the first transmit power allocation coefficient is different from the second transmit power allocation coefficient.

12. The operation method according to claim 8, wherein the transmit power allocation coefficients are indicated by reference signals mapped to the transmission block and a resource used for transmission of the reference signals is dynamically configured based on changes in channel states in a frequency domain.

13. The operation method according to claim 12, wherein a first reference signal for the first terminal is set to be orthogonal to a second reference signal for the second terminal, the first reference signal is transmitted using a power based on a first transmit power allocation coefficient set for the first terminal, the second reference signal is transmitted using a power based on a second transmit power allocation coefficient set for the second terminal, and the first transmit power allocation coefficient is different from the second transmit power allocation coefficient.

14. The operation method according to claim 8, wherein the superimposed signal further includes information indicating increment or decrement of transmit power allocation coefficients for remaining sub transmission blocks excluding a first sub transmission block among the plurality of sub transmission blocks, when the information indicating the transmit power allocation coefficients indicates a first transmit power allocation coefficient for the first sub transmission block among the plurality of sub transmission blocks.

15. A first terminal in a communication system including a base station, the first terminal, and a second terminal, the first terminal comprising a processor; and a memory storing at least one instruction executed by the processor,
 wherein the at least one instruction is configured to:
  receive a transmission block to which a superimposed signal is mapped, the superimposed signal including information indicating a number of resource blocks included in each of a plurality of sub transmission blocks, information indicating transmit power allocation coefficients, first data units for the first terminal, and second data units for the second terminal, wherein the transmission block used for communications in the communication system is divided into the plurality of sub transmission blocks each of which includes at least one resource block, and the transmit power allocation coefficients are set respectively for the plurality of sub transmission blocks;
  identify the transmit power allocation coefficients based on the information indicating transmit power allocation coefficients; and
  decode the first data units from the superimposed signal by using a channel matrix between the first terminal and the base station and the transmit power allocation coefficients for the plurality of sub transmission blocks, the first data units and the second data units being mapped to a same resource in the transmission block,
 wherein the plurality of sub transmission blocks are configured based on a first channel state between the base station and the first terminal and a second channel state between the base station and the second terminal.

16. The first terminal according to claim 15, wherein a same modulation and coding scheme (MCS) level is applied to the plurality of sub transmission blocks included in the transmission block.

17. The first terminal according to claim 15, wherein the information indicating the number of resource blocks included in each of the plurality of sub transmission blocks and the information indicating the transmit power allocation coefficients are included in downlink control information (DCI) of the superimposed signal.

18. The first terminal according to claim 15, wherein the transmit power allocation coefficients are indicated by reference signals mapped to the transmission block and a resource used for transmission of the reference signals is dynamically configured based on changes in channel states in a frequency domain.

19. The first terminal according to claim 15, wherein the superimposed signal further includes information indicating increment or decrement of transmit power allocation coefficients for remaining sub transmission blocks excluding a first sub transmission block among the plurality of sub transmission blocks, when the information indicating the transmit power allocation coefficients indicates a first transmit power allocation coefficient for the first sub transmission block among the plurality of sub transmission blocks.

* * * * *